Nov. 3, 1959     H. N. HANKOFF     2,910,930
TABLE GRILL
Filed July 3, 1957
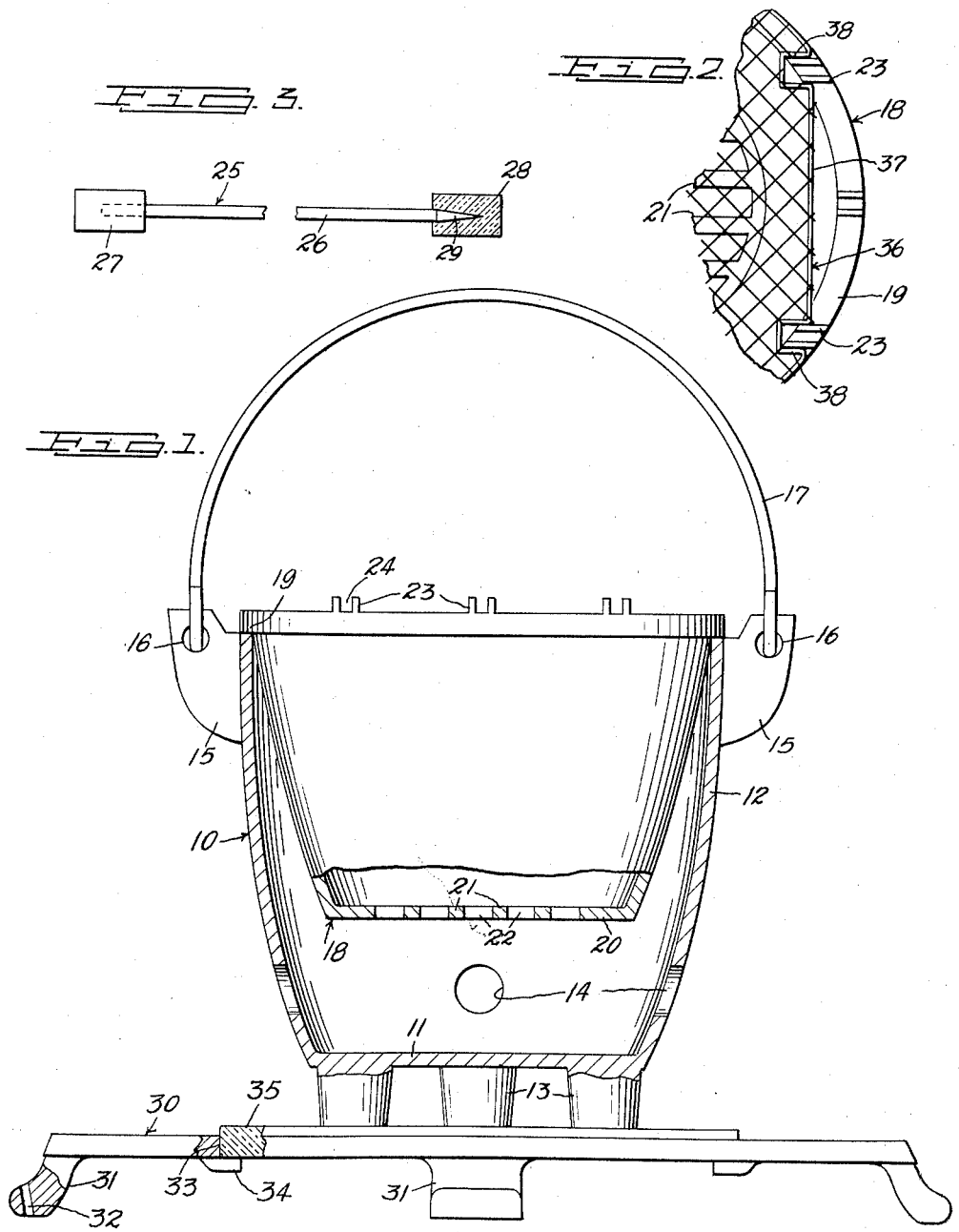
INVENTOR.
HARRY N. HANKOFF
BY
Howard E. Thompson
ATTORNEY

2,910,930

TABLE GRILL

Harry N. Hankoff, North Miami Beach, Fla.

Application July 3, 1957, Serial No. 669,865

1 Claim. (Cl. 99—421)

This invention deals with a grill and barbecue device adapted for use upon a table for the purpose of heating hors d'oeuvres or canapes of various types and kinds, as well as for barbecuing frankfurters and the like. More particularly, the invention deals with a device of the character described, wherein the base or trivet employs a plurality of legs apertured to receive and support spears, to which are attached frankfurters or the like, preparatory to heating the same over the grill.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a vertical sectional view through a grill, with parts of the construction shown in elevation.

Fig. 2 is a detail plan view of part of the upper edge of the grill, showing part of a wire grill top supported thereon; and Fig. 3 is a broken side and sectional view of a skewer which I employ.

In Fig. 1 of the drawing, I have shown at 10 a bowl-like urn, comprising a bottom wall 11 and an upwardly and outwardly flared curved outer wall 12. A plurality of legs 13 extend downwardly from the bottom wall. The side walls of the urn have, adjacent but above the bottom wall 11, a plurality of vent apertures 14. The side wall 12 has, at opposed sides, projecting ears 15, apertured, as seen at 16, to receive a handle or bail 17.

At 18 I have shown a bowl-like fire box, having an outwardly flanged upper edge 19 adapted to seat upon the upper edge of the wall 12 of the urn, as clearly illustrated. At 20 is shown the bottom wall of the grill, having a plurality of parallel bars 21 and spaced apertures 22 to form a grate bottom for the fire box 18.

It will be noted that the bottom wall 20 of the grill is positioned above the apertures 14, so as to provide a direct upward draft through the apertures 22 in the use of the device. At the same time, any ash from the briquettes or other fuel used can drop upon the bottom wall 11, which is positioned below the apertures 14.

The upper flanged edge 19 of the fire box 18 has, at opposed sides, three pairs of lugs 23, the pairs of lugs on one side of the fire box 18 only showing. However, the opposed side will have the same three lugs in direct alinement with those shown. These lugs form tracks 24, in which skewers 25, or the rods 26 thereof, are adapted to be arranged and rotated so that any article of food supported on the rod 26 can be barbecued over the grill. The skewer 25 has a fixed insulated fingerpiece end 27 and a detachable similar end 28 to receive the pointed end 29 of the rod 26. This pointed end facilitates mounting of the food product upon the rod 26.

Turning to Fig. 1 of the drawing, I have shown at 30 a base or trivet, having a plurality of circumferentially spaced downwardly extending legs 31, the showing of the legs in the accompanying drawing being minimized for sake of simplicity. It is preferred, however, that a relatively large number of the legs be employed so that apertures 32 of said legs can support a plurality of spears in an upwardly diverging position which would result from the angularity of the apertures 32, the spears supporting frankfurters or the like upon the upper ends thereof, so that they will be directly accessible and useable upon the top of the grill to heat the same, preparatory to consumption.

The base 30 has a central large aperture 33, at the periphery of which are a plurality of inwardly extending lugs 34 forming closures or stops beneath the aperture 33, so as to support a porcelain or other tile 35, upon which the urn 10 is supported, in the manner indicated. The tile can be decorative for appearance purposes.

By reason of this construction, the entire device can be directly supported upon a table without danger of any heat transmission to the table top.

Considering Fig. 2 of the drawing, here is shown a partial view of the upper flanged edge 19 of the fire box 18 and at 36 is shown a detachable wire grill, shaped to fit within boundaries of the flange top 19 and having, at opposed sides, straight rod portion 37, in which are formed notches 38 to engage the outermost pairs of lugs 23 at each side of the fire box for definitely positioning the wire grill 36 upon the top of the fire box 18. The wire grill can be utilized for heating foods of any type or kind supported above the main fire box 18. This construction would be useable particularly upon larger sizes of devices of the kind under consideration; whereas, the smaller sizes of devices will be used primarily for heating or barbecuing hors d'oeuvres, canapes and snacks of various types and kinds.

While the invention has been described primarily as a barbecuing or grilling device, it will be apparent that the device can also be utilized as a heater or warmer for the heating or warming of foods, beverages or the like.

Having fully described my invention, what I claim as new and desire to secure by Letters Patent is:

A device of the character described, comprising an urn, a fire box supported upon the upper edge of the urn with the fire box bottom of the fire box supported above the bottom of the urn, the walls of the urn, below the fire box bottom and above the urn bottom, having a plurality of circumferentially spaced vent apertures, a handle member for said urn, the bottom of the urn having a plurality of depending feet, the upper edge of the fire box having a plurality of pairs of lugs at opposed sides thereof and in alinement with each other, a skewer for positioning in pairs of lugs on opposed walls of the fire box and rotatable in the apertures between the pairs of lugs, said skewer having insulated fingerpiece ends supported upon the rod of the skewer, and one end of the rod being pointed.

References Cited in the file of this patent

UNITED STATES PATENTS

| 246,561 | Sassinot et al. | Aug. 30, 1881 |
| 422,899 | Adams et al. | Mar. 11, 1890 |
| 607,642 | Botelho | July 19, 1898 |
| 1,741,400 | Bocchino | Dec. 31, 1929 |
| 2,290,802 | De Quintana | July 21, 1942 |

FOREIGN PATENTS

| 10,586 | Great Britain | May 16, 1896 |